Patented Dec. 27, 1938

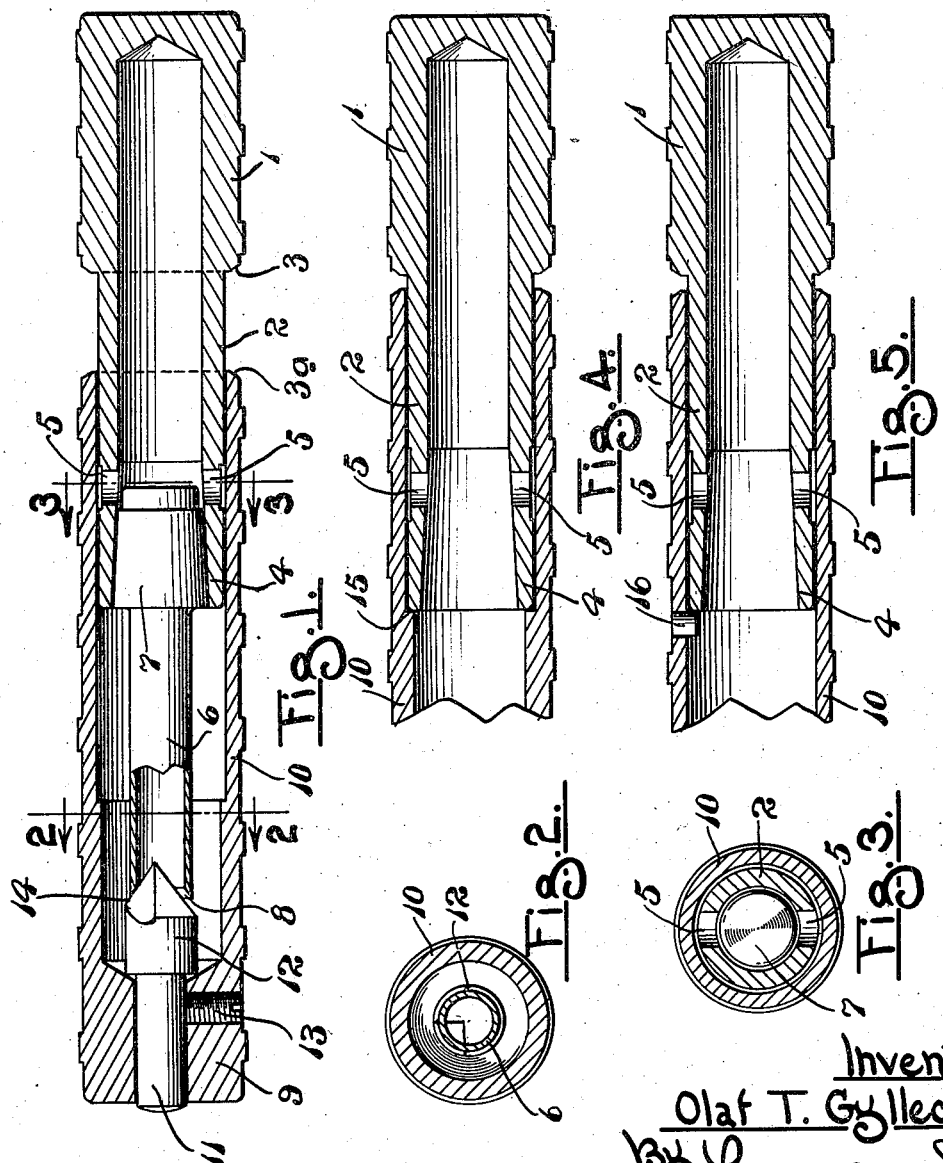

2,141,712

UNITED STATES PATENT OFFICE 2,141,712

DRILL SHARPENER

Olaf T. Gylleck, Grand Haven, Mich., assignor to The Challenge Machinery Company, Grand Haven, Mich., a corporation of Michigan Application December 28, 1936, Serial No. 117,897

7 Claims. (Cl. 76—82)

This invention relates to drill sharpeners and more particularly to an appliance for sharpening the cutting edges of hollow drills such as are used in drilling holes through paper. The drills, rotated in any conventional type of drilling machine or drill press, may be brought down and pressed against a pack of sheets of paper, the drill cutting disks from the sheets of paper downwardly in succession and said disks passing upwardly into the hollow drill.

It is desirable to keep the beveled cutting edge at the lower end of the hollow drill in a sharp and efficient condition. Therefore it is necessary from time to time to sharpen the drills. My invention is directed to an effective and practical appliance or implement which may be manually operated to correctly sharpen the paper drill in a simple and practical manner.

An understanding of the invention may be had from the following description, taken in connection with the accompanying drawing, in which, Fig. 1 is a longitudinal section of the drill sharpener of my invention showing the manner in which the parts are assembled for drill sharpening.

Figs. 2 and 3 are transverse sections taken substantially on the planes of lines 2—2 and 3—3, respectively, of Fig. 1, and Figs. 4 and 5 are fragmentary longitudinal sections similar to that shown in Fig. 1, showing slight modifications in detail of structure.

Like reference characters refer to like parts in the different figures of the drawing.

In the drill sharpening appliance which I have invented, a tubular member is provided having a handle portion 1 and a reduced cylindrical part 2 extending therefrom at one end, with an annular shoulder between the parts 1 and 2 which preferably is beveled as indicated at 3. At the free end of the part 2 a socket 4 is made for the reception of the tapered head of a drill; and through the tubular portion 2 opposed openings 5 are made at a position such that the end of the drill head may be engaged by a tool or other implement to disconnect the same from the socket should it be necessary.

The paper cutting drill comprises a tube 6 of thin metal at one end of which is a tapered head 7 adapted to be received in the socket 4. The lengths of the heads 7 and their diameters may vary somewhat but they will fit within and be centered in the socket 4 irrespective of such discrepancy in identity of dimensions. At the other end of the tubular drill 6 a beveled cutting edge, such as indicated at 8, is made inwardly and in the direction of the length of the drill as shown.

Associated with the first member of the drilling appliance is a second member which at one end has a body 9 from which a relatively long integral tubular sleeve portion 10 extends, being machined at its inner sides so as to receive the part 2 of the first member described which is likewise machined at its outer curved sides to dimensions such that it will enter the sleeve 10 but have a relatively close fit therein, so that when the part 2 is inserted into the sleeve 10, as shown in Fig. 1, there will be a relatively long bearing of the part 2 against the inner surface of the sleeve 10.

A metal sharpener is used comprising a shank 11 and a cutting head 12, the body 9 being axially bored for the reception of the shank 11 therein, and a set screw 13 is threaded laterally through the body 9 against the shank to hold the drill cutting or sharpening head securely in place, with said head near the body 9 and within the sleeve 10. The cutter is of the single flute type having a cutting or sharpening flute 14.

In the operation of sharpening the drill, it is positioned with its tapered head 7 snugly received within and centered by the socket 4. Then the drill is inserted into the sleeve 10 until its cutting end at 8 comes in contact with the flute 14 of the head 12. When in this position the cylindrical part 2 will have a close rotative bearing within the outer end portion of the sleeve 10. Then by taking the two members in the hands and rotating them in relatively opposite directions, or holding the member which carries the sharpening head stationary and rotating the other in the proper direction the drill may be very quickly and easily sharpened. The drill will be held in proper alinement centrally of the sleeve 10 and therefore in proper position relative to the flute 14 of the sharpening head because of the relatively long bearing of the part 2 within the sleeve 10.

The cutting edge of the drill is of quite delicate nature and it should not be jammed against any object with force and to prevent entering the drill too rapidly into the device so that its edge would be brought into sudden and forceful contact with the cutter 12 an air cushion is provided.

The outer end of the tubular drill holder 1 is closed to prevent the escape of air and although the openings 5 will permit air to escape as long as they are outside the tubular body member 10, after the drill holder has been entered into the body member far enough to close the openings 5 the air within the device is trapped and will compress upon further movement and resist rapid movement of the holder into the body because of the close fit between the parts. However, the air will escape between the members slowly and the drill may be entered into the device with little resistance and brought into proper contact with the sharpener, if moved slowly.

In connection with this feature of the invention it is to be noted that although the drill is hollow and theoretically air can pass through it, as a matter of fact in actual practice the opening through the drill is usually tightly filled with disks of paper which have been moved into it during the cutting operation and therefore in most cases air cannot pass through the drill and a cushioning effect occurs from the point where the drill holder enters the body member.

In Figs. 4 and 5 means are provided such that the insertion of the part 2 into the sleeve 10 is stopped before the shoulder at 3 engages against the end of the sleeve 10. In the first form shown in Fig. 1 the parts can be positioned when not in use so that these shoulders come against each other and therefore the shoulder at 3 is of a beveled character and the end of the sleeve 10 is similarly beveled, as indicated at 3a, to prevent pinching of the hands or fingers of the one handling the device. In Fig. 4 the outer end of the sleeve 10 is bored interiorly to a larger diameter making a shoulder 15 which serves as a stop for the inner end of the socket portion 4 before said shoulder at the junction of the parts 1 and 2 comes against the end of the sleeve. In Fig. 5 a stop pin 16 is inserted through one side of the sleeve 10 for the same purpose.

The drill sharpening appliance described has proved very practical, useful and serviceable. Drills are very quickly and accurately sharpened. The invention is defined in the appended claims and is to be considered comprehensive of all forms of structure coming within their scope.

I claim:

1. In a drill sharpener, an elongated tubular body member closed at one end, a sharpening tool mounted at the closed end thereof and extending into said body member, a drill carrying member having a socket at one end to receive the shank of a tubular drill, said drill carrying member being insertable into the tubular body member to bring the cutting end of the drill into engagement with the sharpening tool, said drill carrying member having an exterior diameter slightly less than the interior diameter of the tubular body to provide a close rotatable bearing engagement of said members.

2. In a drill sharpener, a tubular body member, a drill sharpener fixed in one end of said body member and extending thereinto, a drill carrying member having a socket adapted to receive the shank of a drill, said drill carrying member being insertable into the tubular body member and having a close bearing therein whereby the drill is held in axial alinement with the tubular body member and is guided and held in proper relation to the sharpener, as and for the purposes described.

3. A sharpener for a drill having a shank adapted to fit the chuck of a drill spindle comprising a drill holder shaped to fit the shank of a drill in the same manner as the chuck of the drill spindle fits said shank, a rotatable bearing portion of considerable length on said drill holder having its axis in alinement with the axis of the drill, a body having a rotatable bearing portion complementary to the bearing portion of the drill holder and likewise of considerable length, said first bearing portion adapted to be inserted in said second bearing portion, and a cutting tool mounted in said body in position to act upon the cutting edge of said drill when the same is rotated.

4. The elements in combination defined in claim 3 in which said drill holder and said body member are closed excepting at their telescoping ends and the fit between the members when they are in operative relation is sufficiently close to prevent ready escape of air from the interior thereof.

5. A sharpener for a drill comprising a body member having a closed end and an open end, a cutter located within the body member at its closed end, a cylindrical bearing portion on the interior of the body member extending interiorly from the open end a substantial distance, a drill holder having a socket to receive a drill and having its outer portion closed and a cylindrical bearing portion on the exterior of said drill holder having its axis in alinement with the axis of the drill when mounted therein and having a diameter to closely fit the bearing portion of the body member.

6. A drill sharpener comprising an elongated tubular member having one end closed, a sharpening cutter secured to said closed end and extending inwardly of said tubular member, a second tubular member, having an enlarged hand engageable portion thereon, adapted to fit closely within said first named tubular member, and means in the open end of said second tubular member adapted to receive and retain the shank of a hollow drill.

7. A drill sharpener comprising the elements in combination defined in claim 6, and means for stopping entrance of said second member into said first member before the hand engageable portion reaches the end of said first member.

OLAF T. GYLLECK.